United States Patent
Nakagawa et al.

Patent Number: 5,395,562
Date of Patent: Mar. 7, 1995

[54] METHOD OF PRODUCING MESOCARBON MICROBEADS AND METHOD FOR QUALITY CONTROL OF SINTERED MESOCARBON PRODUCTS

[75] Inventors: Yoshiteru Nakagawa, Yamatokoriyama; Takayuki Azuma, Toyonaka; Hideki Tamamura, Nishinomiya; Tadashi Murakami, Settsu; Norio Murakami, Osaka; Yasuo Minamitani, Sennan; Noboru Mimura, Kawachinagano, all of Japan

[73] Assignee: Osaka Gas Company, Ltd., Osaka, Japan

[21] Appl. No.: 30,489
[22] PCT Filed: Jun. 23, 1992
[86] PCT No.: PCT/JP92/00800
  § 371 Date: Apr. 2, 1993
  § 102(e) Date: Apr. 2, 1993
[87] PCT Pub. No.: WO93/02988
  PCT Pub. Date: Feb. 18, 1993

[30] Foreign Application Priority Data
  Aug. 2, 1991 [JP] Japan .................. 3-194310
  Aug. 22, 1991 [JP] Japan .................. 3-211076

[51] Int. Cl.⁶ .............................. B29C 67/04
[52] U.S. Cl. .............................. 264/40.1; 264/126
[58] Field of Search ..................... 264/126, 40.1

[56] References Cited

U.S. PATENT DOCUMENTS

| | | | |
|---|---|---|---|
| 4,950,443 | 8/1990 | Kawakubo et al. | 264/126 |
| 4,985,184 | 1/1991 | Takahashi et al. | 264/126 |
| 5,046,703 | 9/1991 | Kamiyama et al. | 251/368 |
| 5,169,718 | 12/1992 | Miura et al. | 428/408 |
| 5,202,293 | 4/1993 | Okamoto et al. | 501/95 |

FOREIGN PATENT DOCUMENTS

| | | |
|---|---|---|
| 60-51612 | 3/1985 | Japan . |
| 1212207 | 8/1989 | Japan . |
| 1290559 | 11/1989 | Japan . |

*Primary Examiner*—Allan R. Kuhns
*Attorney, Agent, or Firm*—Cushman Darby & Cushman

[57] ABSTRACT

A sintered product based on mesocarbon microbeads is prepared by pressure-molding mesocarbon microbeads (MCMB) having an MSP (maximum solubility percent) value of 30 to 38% by volume whereby a body is formed, and sintering the body, wherein MSP represents the percentage volume reduction (volume %) determined by heating a given amount of an MCMB to 350° C. under a pressure load of 10 kgf/cm². The quality of a molded MCMB sintered product can be controlled by determining the percentage volume reduction (MSP) of an MCMB by heating it under a given pressure load in a predetermined space using the MSP value so found as an indicator.

9 Claims, 4 Drawing Sheets

METHOD OF PRODUCING MESOCARBON MICROBEADS AND METHOD FOR QUALITY CONTROL OF SINTERED MESOCARBON PRODUCTS

TECHNICAL FIELD

The present invention relates to a method of producing high-strength sintered products from mesocarbon (mesophase carbon) microbeads (hereinafter referred to briefly as MCMB).

The invention also relates to a method for controlling the quality of sintered MCMB bodies.

BACKGROUND ART

A well-known method of evaluating the quality of MCMB is an analysis using solvents. This method evaluates the quality of MCMB using, as indices, the percentages (by weight) of toluene-insoluble fraction (TI), quinoline-insoluble fraction (QI) and β-resin [TI-QI].

However, for the quality evaluation of MCMB, this method is not wholly satisfactory. While what matters in the application of MCMB is the flexural strength of sintered bodies obtainable by sintering the MCMB at a temperature not below 1,000° C., there actually exist MCMB species showing substantially the same TI, QI and β-resin percentages and yet giving widely different flexural strength values after sintering at 1,000° C. or above. The reason for this variation is presumably as follows. The binding component of MCMB is so reactive and susceptible to oxidation that the MCMB is ready to undergo oxidative degradation. Compared with unoxidized MCMB, MCMB that has undergone low-temperature oxidation yields a considerably lower flexural strength value after firing at 1,000° C. or above, even though its TI, QI and β-resin contents remain almost unchanged from the unoxidized MCMB.

The only reliable method available today for the quality evaluation of MCMB comprises taking a sample of MCMB from a lot in question, subjecting it to pressure-molding under a given pressure load, sintering the molding at 1,000° C. and measuring the flexural strength of the sintered body. No method is available for predicting the characteristics of a 1000° C.-sintered body from the characteristics of raw MCMB.

Furthermore, in some instances, the pressure-molded MCMB swells in the course of firing up to 1,000° C., thus failing to give satisfactory sintered products of practical value. There is no method, either, for prognosticating, based on the characteristics of unprocessed MCMB, whether such swelling would occur or not.

DISCLOSURE OF THE INVENTION

The present invention provides a method of producing sintered products from MCMB, viz.:

A method of producing shaped and sintered high-strength products from MCMB which comprises subjecting MCMB with an MSP (maximum solubility percent) of 30 to 38% by volume to pressure molding and, then, to sintering, where "MSP" represents the percentage reduction in volume (% by volume) upon heating a given amount of MCMB to 350° C. at a pressure of 10 kgf/cm².

More particularly, the index MSP employed herein to express an important characteristic of MCMB is defined as follows:

$$MSP = (V_1 - V_2)/V_1 \times 100 \text{ (\% by volume)}$$

where $V_1$ is the volume of MCMB as found when a given amount of the MCMB is placed in a vessel and subjected to a pressure of 10 kgf/cm² at atmospheric temperature and $V_2$ is the volume of the MCMB when the same is heated to 350° C. at a constant pressure of 10 kgf/cm².

The present invention further provides a method for controlling the quality of shaped and sintered products of MCMB, viz.:

A method of controlling the quality of a pressure-molded, sintered MCMB body which comprises heating MCMB in a given space under a given pressure load and determining its percent reduction in volume (MSP).

BRIEF DESCRIPTION OF THE DRAWINGS

FIG. 5 is a diagrammatic representation of the relation which holds between MSP and the flexural strength of the sintered product of the invention which was manufactured by sintering an MCMB body at 1,000° C.

BEST MODE FOR CARRYING OUT THE INVENTION

After much research conducted in view of the above state of the art, the present inventors discovered the following finding.

Figure 1:
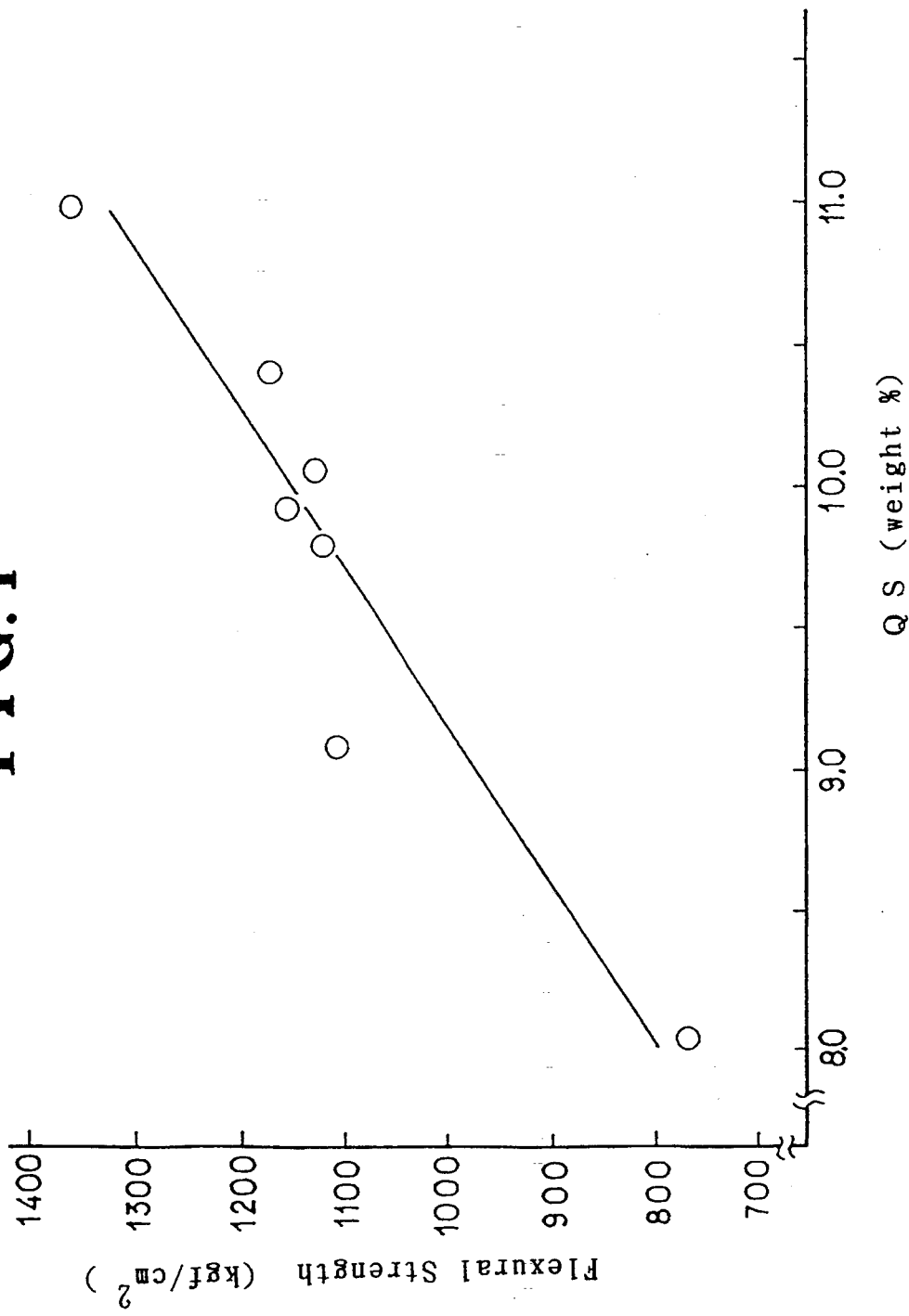
FIG. 1 is a diagrammatic representation of the relationship between the amount (% by weight) of QS (quinoline-soluble fraction) in unoxidized MCMB immediately after production thereof in an $N_2$ or inert gas atmosphere and the flexural strength (kgf/cm²) of the corresponding molded body sintered at 1,000° C.

First, an unoxidized MCMB immediately after production in an $N_2$ or inert gas atmosphere has a positive correlation between the amount (% by weight) of quinoline-soluble fraction (QS=100−QI) and the flexural strength of a molded body thereof as sintered at 1,000° C. (cf. FIG. 1).

Figure 2:
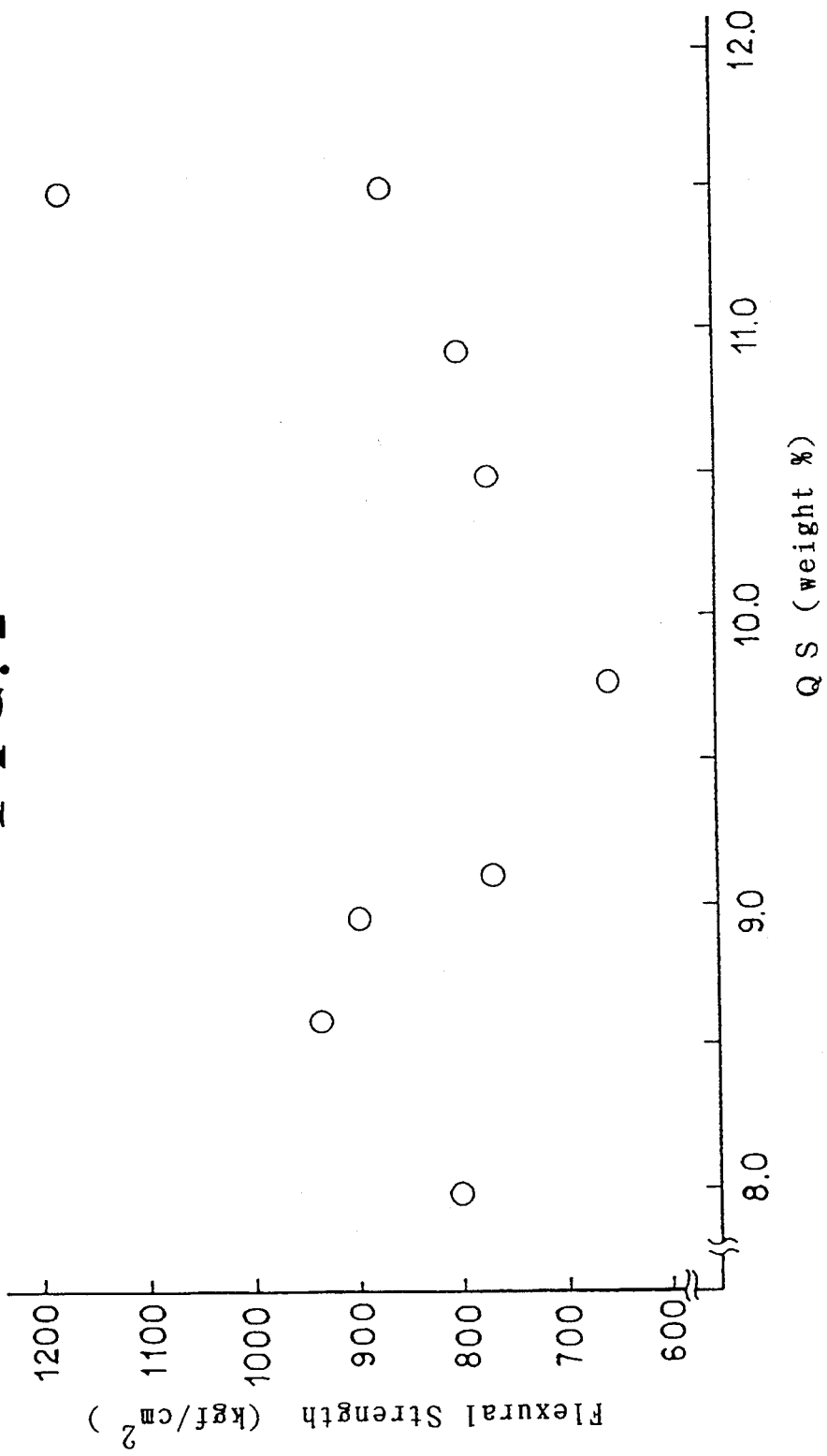
FIG. 2 is a diagrammatic representation of the relationship between the amount of QS (% by weight) in MCMB allowed to stand in the air and the flexural strength (kgf/cm²) of an MCMB sintered body obtained by firing at 1,000° C.

In contrast, as shown in FIG. 2 and Table 1, an MCMB exposed to air after production shows no definite correlation between the amount (% by weight) of QS and the flexural strength (kgf/cm²) of a molded body thereof as sintered at 1,000° C.

The above-mentioned sintered bodies were respectively produced by molding an MCMB having an average particle size of 6 μm at a pressure of 0.4 ton/cm² to prepare a body measuring 30 mm in diameter and 10 mm long and sintering the body in an inert gas atmosphere with the temperature being increased at a rate of 150° C./hour from room temperature to 1,000° C. and held at 1000° C. for one hour.

TABLE 1

| MCMB | TI (%) | QI (%) | QS (%) | β-Resin (%) | $O_2$ (%) | MSP | Flexural strength (kgf/cm²) |
|---|---|---|---|---|---|---|---|
| 1 | 95.19 | 86.71 | 13.29 | 8.49 | 1.5 | 34.7 | 1057 |
| 2 | 95.48 | 87.48 | 12.52 | 8.00 | 1.21 | 24.4 | 391 |
| 3 | 95.72 | 90.00 | 10.00 | 5.72 | 1.23 | 36.1 | 1290 |
| 4 | 95.72 | 90.12 | 9.88 | 5.60 | 1.60 | 32.1 | 825 |

Note: MCMB Sample 4 was produced by oxidizing Sample 3 in the air at 80° C. for 18 hours.

It will be apparent from Table 1 that whereas the amount of QS alone cannot be a reliable quality indicator of MCMB, the flexural characteristic of the sintered body obtainable from MCMB can be predicted when MSP is used as the indicator.

Figure 3:
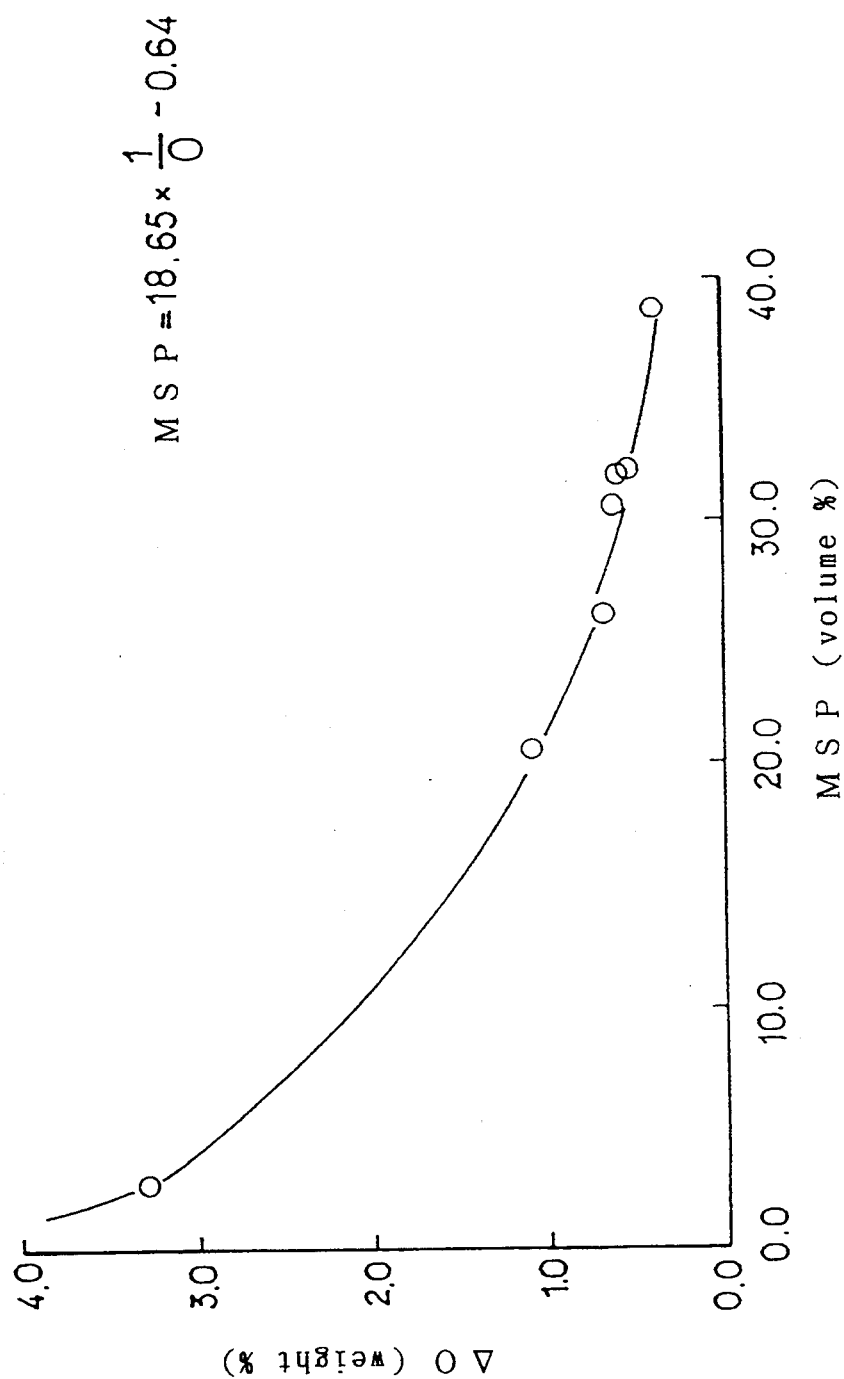
FIG. 3 is a diagrammatic representation of the relationship between the MSP (% by volume) determined by oxidizing an unoxidized MCMB, immediately after production thereof in an $N_2$ or inert atmosphere, under given conditions and the incremental amount of atomic oxygen (ΔO%) in the MCMB.

It was also made clear that, as shown in FIG. 3, a substantially inverse relation holds between the MSP of the oxidized MCMB obtained by oxidizing an unoxidized MCMB, immediately after production thereof in an $N_2$ or inert gas atmosphere, under given conditions and the increase in the atomic oxygen content (ΔO%) of MCMB.

The inventor further discovered that, without regard to oxidation, the self-sinterability of MCMB and the consequent development of strength in a sintered body are dependent on the amount of the binding component which melts at temperatures up to 350° C. Thus, the binding component of MCMB which melts on heating of a molded body finds its way into the spaces between MCMB particles to decrease the volume of the body and, at the same time, binds up the MCMB particles to produce the strength of the sintered body. It was found that, therefore, by observing the behavior of the above binding component present on the surface of MCMB, the characteristics of the sintered MCMB body can be predicted and evaluated. The inventor further discovered that MSP can be used as an indicator of the binding fraction which has a profound influence on the strength of the sintered product.

The inventor further explored the incidence of swelling which occurs in the 1,000° C. sintering of an MCMB body pressure-molded at atmospheric temperature and the consequent failure to give a satisfactory sintered body and found that when the MSP determined under a pressure load of 10 kgf/cm² exceeds 38% by volume, the strength of the sintered body cannot be sufficiently improved in many instances because of said expansion during sintering if the molding pressure for MCMB exceeds 0.4 tons/cm².

Furthermore, it was found that when the MSP of MCMB is less than 30% by volume, too, the strength of the molded and sintered MCMB is not sufficiently increased (cf. FIG. 5).

Therefore, the MSP of MCMB is preferably in the range of 30 to 38% by volume. However, when MSP is in the range of 36 to 38%, there are cases in which the strength of the sintered MCMB body will not be sufficient. Therefore, MSP is more preferably in the range of 30 to 36% by volume.

The subsequent research further revealed that when the MSP of MCMB is too high, it can be reduced to the desired level by oxidizing the MCMB. This oxidation treatment is preferably carried out in an oxidizing atmosphere at a temperature below the temperature at which the binding fraction of MCMB begins to melt. Though it varies with types of MCMB, the temperature at which the binding fraction begins to melt is usually about 150° C.

The inventor further found that when an unoxidized MCMB immediately after production in an $N_2$ or inert gas atmosphere is oxidized at a temperature below the temperature of about 150° C. at which its binding fraction begins to melt to adjust its MSP to 30-38% by volume, the amount of increase in atomic oxygen content $\Delta O$ $(=O_2-O_1)$, wherein $O_1$ is the atomic oxygen content (% by weight) before oxidation treatment and $O_2$ is the atomic oxygen content after oxidation treatment, becomes $\Delta O = 0.5$–$0.6\%$ by weight.

As a conclusion, the inventor discovered that the flexural strength of a molded and sintered MCMB body can be increased by controlling the MSP of starting material MCMB to a value within the range of 30 to 38% by volume and that the expansion during sintering can then be substantially prevented.

The present invention was developed on the basis of the above findings.

Figure 4:
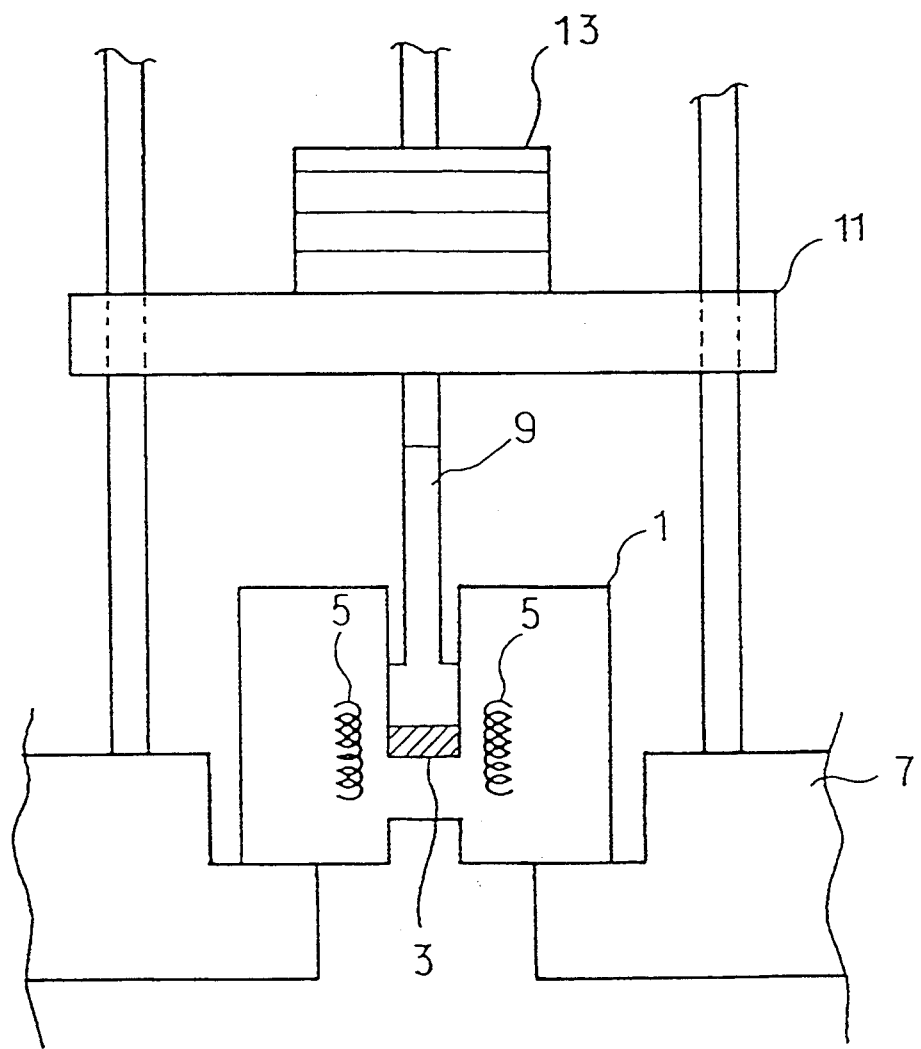
FIG. 4 is a schematic sectional view showing an exemplary setup for use in the determination of physical properties of the MCMB obtained by the method of the invention.

Presented in FIG. 4 is a schematic sectional view showing an exemplary setup for the determination of MSP in the practice of the invention.

The MCMB sample to be evaluated for quality is set in a space (3) defined in a sample holder (1) which is supported by a frame (7). The space (3) is surrounded by heaters (5),(5). The MCMB sample is subject to a pressure load (13) through a piston (9) and a loading plate (11).

Determination of MSP is carried out using the setup shown in FIG. 4, as follows. A predetermined amount of size-selected MCMB (e.g. about 1–50 μm in particle diameter and about 3–5 grams) are filled in the space (3) and heated to about 300°–600° C. under a pressure load of about 1–100 kgf/cm² By this procedure, the binding component on the surface of the MCMB is fused and enters into spaces between the microbeads so that the whole sample volume is reduced gradually.

The inventor's research revealed that the larger the percent volume reduction (the loss of volume on heating divided by the volume before heating) under the above-mentioned pressure and heat conditions of about 1–100 kgf/cm² and about 300°–600° C., the greater is the proportion of the binding component on MCMB and the higher is the melt-flow characteristic of the MCMB. Therefore, the percentage volume reduction (% by volume) that occurs when MCMB is heated to 350° C. under a pressure load of 10 kgf/cm² was defined as MSP.

The evaluation of MCMB according to QS (% by weight) in solvent analysis is applicable to MCMB which has not been oxidized. However, since MCMB is handled in the air and, therefore, oxidized in normal field practice, the evaluation method based on QS (% by weight) is not practically applicable. The method of evaluation based on the determination of atomic oxygen is not dealing with the absolute value of atomic oxygen as an indicator but uses the relative value calculated as the difference from the reference amount of atomic oxygen in the unoxidized MCMB immediately after production thereof in an $N_2$ or inert atmosphere and is, therefore, difficult to use.

In contrast, when MSP as defined above is utilized, the relation shown in FIG. 5 was found between MSP and the flexural strength of the molded MCMB sintered at 1,000° C. Thus, an MCMB with a particle size of 6 μm was molded at a pressure of 0.4 ton/cm² to prepare a molded body sized 30 mm in diameter and 10 mm long and this molded body was heated in an inert gas atmosphere at a rate of 150° C./hour and held at 1,000° C. for 1 hour. The sintered body was then subjected to flexure test to determine its flexural strength. The MCMB used in the flexure test was obtained by subjecting an MCMB produced in an $N_2$ atmosphere to oxidation treatment in the air at 50°–120° C. for 0.5 to 5 hours. In FIG. 5, the horizontal axis represents MSP of the thus oxidized MCMB.

It is apparent from FIG. 5 that the following relation holds between the flexural strength (kgf/cm$^2$) of an MCMB sintered body and MSP (% by volume).

Flexural strength = 37.44 × exp (0,096 × MSP)

It is clear that the flexural strength of an MCMB sintered body can be predicted from MSP. It is also apparent that when the MSP value of MCMB is 30 to 38% by volume, a high-strength sintered body can be obtained. When the MSP of MCMB is in the range of 36 to 38% by volume, some variation is found in the strength of sintered bodies but sintered bodies with a high flexural strength can be obtained with good reproducibility when the MSP value is controlled within the range of 30 to 36% by volume.

The binding component of MCMB is highly reactive and liable to be oxidized. The decrease in this binding fraction due to oxidation and the consequent deterioration of physical properties of the sintered body can be easily predicted by the method of the present invention.

Furthermore, as the unoxidized MCMB is subjected to oxidation treatment under the above-mentioned conditions for the prevention of swelling on sintering to control the atomic oxygen increment (ΔO%) to 0.5–0.6% by weight, MSP is controlled to about 30 to 38% by volume, with the result that the sintering swelling is successfully precluded to yield high-strength sintered products. Moreover, it was found that once MCMB is subjected to the above oxidation treatment, oxidation reaction does not proceed any longer at any temperature not exceeding the oxidation temperature used. Therefore, by producing an MCMB having a large MSP value and subjecting it to forced oxidation to adjust its MSP to a value in the range of 30 to 38% by volume, preferably 30 to 36% by volume, there can be obtained a stable MCMB which is virtually inhibited against further oxidation.

MCMB can be produced by, inter alia, the following method described in JP Kokai H-1-27968. This method consists of the following steps.

Pyrolytic depolymerization of tar→centrifuging-→melt composition adjustment→drying→dispersing/size selection→product The above process is performed in an $N_2$ atmosphere up to the drying step and the dispersing/size selection step is carried out in the cold. Therefore, MCMB immediately after production is substantially non-oxidized.

It was found that the QS (% by weight) value of this unoxidized MCMB can be controlled within the range of 6.9 to 12.2% in the melt composition adjustment step, for example by using toluene as a washing fluid for the centrifugal cake of MCMB and adjusting the number and/or temperature of such washing operations.

Furthermore, as described in Example 1, the MSP value of unoxidized MCMB can be adjusted by limiting the number of toluene washings of the MCMB cake to a certain value. Therefore, it is also possible to subject MCMB immediately after production to solvent washing to control its MSP to 30–38% by volume or, more preferably, 30 to 36% by volume, pressure-molding the same and sintering it to provide a high-strength MCMB sintered product. However, when the MCMB whose MSP has been controlled within the above range by solvent washing alone is allowed to stand in the air, it is oxidized so that its MSP is altered. Particularly in the summer season when the atmospheric temperature is high, MSP is ready to change and cannot be easily controlled. In contrast, when MCMB whose MSP has been controlled within the above range by forced oxidation of freshly produced MCMB as described above, its MSP is substantially not changed even when the MCMB is allowed to stand in the air, thus insuring easy MSP control. Of course, the solvent-washed MCMB may be further subjected to forced oxidation to control its MSP within the above-mentioned range.

The MSP of oxidized MCMB can be controlled within the range of 30 to 38% by volume in accordance with whichever of the following flows.

(1) Pyrolytic depolymerization of tar→centrifuging-→melt composition adjustment→drying→oxidizing-→dispersing/size classification→product (2) Pyrolytic depolymerization of tar→centrifuging-→melt composition adjustment→drying→dispersing/size selection→oxidizing→product In whichever of the above schemas, oxidation can be achieved by contacting the MCMB, either before or after the dispersing/size selection step, with an oxidizing gas (e.g. air, oxygen-rich air, pure oxygen) to adjust the MSP of MCMB to about 30 to 38% by volume. This oxidation can be conducted at a temperature lower than the temperature (about 150° C.) at which the binding component of MCMB begins to melt. There is no limit to the method of oxidation, only if the desired effect can be obtained. If the oxidizing temperature is less than 50° C., the oxidation process will be too prolonged. Therefore, this forced oxidation is preferably carried out at a temperature not below 50° C. However, the parameter of temperature is not critical, for the necessary oxidation can be accomplished even at a low temperature by prolonging the procedure.

When an MCMB having an MSP of 30 to 38% by volume is pressure-molded, sintered and used as a sliding part, for instance, about 1 to 30%, by weight of MCMB, of carbon fiber crushed to an aspect ratio of about 0.1 to 1,000 can be added to MCMB to reduce the wear rate. The carbon fiber may be any of coal tar pitch-, petroleum pitch- or PAN-based fibers but coal pitch-based carbon fiber is preferred. The coal pitch carbon fiber may be any of stabilized fiber, carbon fiber and graphitized fiber, although stabilized fiber is preferred. Moreover, in order to reduce the coefficient of wear for use as a sliding part, about 1 to 10%, by weight of MCMB, of a ceramic boride, such as $TiB_2$, with a particle size of about 0.1 to 10 μm may be added to the starting material MCMB.

EFFECT OF THE INVENTION

In accordance with the present invention, a high-strength MCMB sintered body can be obtained by pressure-molding an MCMB having an MSP value of 30 to 38% by volume and sintering the same.

Furthermore, since the strength of the final MCMB sintered product can be predicted by controlling the production process using the MSP of MCMB as an indicator, the invention insures the production of sintered products of stable quality.

EXAMPLES

The following examples are intended to further demonstrate the features of the invention.

EXAMPLE 1

The three kinds of MCMB (A through C) shown below in Table 2 were all produced from the same tar material. Thus, the starting material tar was subjected to pyrolytic depolymerization reaction at 397° C. and centrifuged. The MCMB cake thus obtained was washed with 4 parts of toluene at a varying temperature for a varying number of times.

The washing conditions, QS and the relationship of MSP and QS are shown in Table 2.

TABLE 2

| MCMB | Washing times | Temperature (%) | Time (hr) | MSP | QS (%) |
|---|---|---|---|---|---|
| A | 1 | 20 | 1 | 41 | 12.7 |
| B | 2 | 80 | 1 | 36 | 10.1 |
| C | 4 | 80 | 1 | 29 | 6.4 |

It is apparent from the data in Table 2 that MSP can be controlled by adjusting toluene washing conditions.

EXAMPLE 2

The three kinds of MCMB (D through F) shown below in Table 3 were all unoxidized microbeads invariably having MSP values exceeding 38% by volume. Results obtained when these microbeads were oxidized in the air at 120° C. for varying times are also shown as $D_1$-$F_1$ in Table 3.

Table 3 further shows the flexural strength values of the MCMB sintered bodies obtained when various kinds of MCMB having an average particle size of 6 μm were molded under a pressure load of 0.4 tons/cm² to provide molded bodies each measuring 30 mm in diameter and 10 mm long and these bodies were then sintered in an $N_2$ atmosphere by heating them at a rate of 150° C./hour up to 1,000° C. and then holding at 1,000° C. for 1 hour.

TABLE 3

| MCMB | Oxidizing treatment | MSP (%) | Flexural strength (kgf/cm²) |
|---|---|---|---|
| D | No | 40.5 | — |
| $D_1$ | 120° C. × 4.8 hr | 35.0 | 1335 |
| E | No | 39.0 | — |
| $E_1$ | 120° C. × 3.0 hr | 35.4 | 1285 |
| F | No | 38.6 | — |
| $F_1$ | 120° C. × 2.8 hr | 34.9 | 1334 |

It is apparent from Table 3 that MSP can be controlled by oxidizing MCMB in the air to thereby provide sintered bodies with high flexural strength values.

EXAMPLE 3

The sample $F_1$ shown above in Table 3 was further allowed to stand in the air at 50° C. for varying hours. The MSP values of the resulting oxidized MCMB samples and the flexural strength values of sintered bodies obtained by sintering them in the same manner as Example 2 are set forth in Table 4.

TABLE 4

| Standing time (days) | MSP (%) | Flexural strength (kgf/cm²) |
|---|---|---|
| 0 | 34.9 | 1334 |
| 10 | 34.9 | 1320 |
| 30 | 34.8 | 1325 |
| 60 | 34.8 | 1327 |

It is apparent from Table 4 that the MCMB subjected to forced oxidation according to the present invention does not substantially undergo further oxidation at temperatures below the temperature used in the oxidation treatment.

We claim:

1. A method of producing a high-strength shaped and sintered MCMB product comprising selecting substantially only mesocarbon microbeads having a maximum solubility percent (MSP) value of 30 to 38% by volume, and (2) pressure-molding and sintering said mesocarbon microbeads, wherein MSP represents the percentage volume reduction (volume %) determined by heating a given amount of MCMB to 350° C. under a pressure load of 10 kgf/cm².

2. A method of producing a high-strength shaped and sintered MCMB product according to claim 1, wherein an MCMB having an MSP value of more than 38% by volume is oxidized prior to pressure-molding to adjust the MSP value to 30 to 38% by volume.

3. A method of producing a high-strength shaped and sintered MCMB product according to claim 2, wherein the oxidation of MCMB is carried out in an oxidizing atmosphere at a temperature below the temperature at which a binding component of said MCMB begins to melt.

4. A method of producing a high-strength shaped and sintered MCMB product according to claim 2, wherein the oxidation of MCMB is carried out in an oxidizing atmosphere at a temperature not exceeding 150° C.

5. A method of producing a high-strength shaped and sintered MCMB product according to claim 1, 2, 3 or 4 wherein the MCMB to be pressure-molded has an MSP value of 30 to 36% by volume.

6. A method of producing a high-strength shaped and-sintered MCMB product according to claim 1, wherein an MCMB having an MSP value of more than 38% by volume is subjected to solvent washing prior to pressure-molding to adjust its MSP value to 30-38% by volume.

7. A method of producing a high-strength shaped and sintered MCMB products according to claim 1, wherein the MSP value is in the range of 30-36% by volume.

8. A method for controlling the quality of shaped and sintered mesocarbon microbeads (MCMB) products which comprises (1) heating mesocarbon microbeads at 350° C. under a pressure of 10 kgf/cm² and (2) selecting for shaping and sintering substantially only those mesocarbon microbeads having a maximum solubility percent (MSP) value of 30-38% by volume, wherein MSP represents the percentage volume reduction (volume percent) determined by heating a given amount of (MCMB) to 350° C. under a pressure of 10 kgf / cm².

9. A method for controlling the quality of shaped and sintered MCMB products according to claim 8, wherein the MSP is in the range of 30-36% by volume.

* * * * *